United States Patent [19]

Bennett

[11] Patent Number: 4,936,339

[45] Date of Patent: Jun. 26, 1990

[54] CARTRIDGE-TYPE CHECK VALVE

[76] Inventor: Barry D. Bennett, 332 Courtland Ave., Harleysville, Pa. 19438

[21] Appl. No.: 379,915

[22] Filed: Jul. 14, 1989

[51] Int. Cl.⁵ ............................................. F16K 15/06
[52] U.S. Cl. .................................... 137/454.6; 137/540
[58] Field of Search ................ 137/454.2, 454.5, 454.6, 137/540, 906

[56] References Cited

U.S. PATENT DOCUMENTS

| | | | |
|---|---|---|---|
| 880,030 | 2/1908 | Leavitt | 137/540 X |
| 2,279,002 | 4/1942 | MacNeil | 251/363 X |
| 4,039,003 | 8/1977 | Cheek | 137/454.6 X |
| 4,049,017 | 9/1977 | Jones | 137/540 |
| 4,136,854 | 1/1979 | Ehmig et al. | 251/361 X |
| 4,368,754 | 1/1983 | Roberts | 137/454.6 X |
| 4,657,043 | 4/1987 | Ampferer et al. | 137/540 X |
| 4,679,584 | 7/1987 | Wolff | 137/454.6 X |
| 4,727,902 | 3/1988 | Unterstein et al. | 137/454.5 |

FOREIGN PATENT DOCUMENTS 2548998  5/1977  Fed. Rep. of Germany ...... 137/540

Primary Examiner—Stephen M. Hepperle
Attorney, Agent, or Firm—Robert Charles Beam

[57] ABSTRACT

The present invention shows an improved cartridge-within-a-cavity, one-way check valve for use in a high-pressure, high-temperature pneumatic environment. The check valve has a body with a valve portion having an annular cavity extending through one end thereof. The valve portion is provided with a plurality of radial openings. Within the annular cavity a plunger and compression means are provided which close off the radial openings. Pressurized fluid flow into the annular cavity will force the plunger back into the central annular cavity against the compression means allowing one-way flow through the radial openings. Within the annular cavity a plunger and compression means are provided which close off the radial openings. Pressurized fluid flow into the annular cavity will force the plunger back into the central annular cavity against the compression means allowing one-way flow through the radial openings in the valve portion.

13 Claims, 1 Drawing Sheet

CARTRIDGE-TYPE CHECK VALVE

BACKGROUND OF THE INVENTION

1. Field of the Invention

The invention relates to an improved cartridge-within-a-cavity, one-way check valve for use in a high-pressure, high-temperature pneumatic environment.

2. Description of the Prior Art

Cartridge-within-a-cavity, one-way check valves have many uses in industry, however the preferred embodiment of the present invention is intended for one particular use. Large pneumatic systems, such as those employed on large ships, employ dessicant units to remove water from the pneumatic working fluid. These dessicant units are typically redundant, so that one may be removed from the flow path of the pneumatic fluid and purged with hot air to dry captured water vapor from the dessicant in a regeneration cycle.

In order to insure one-way flow of pneumatic fluid and prevent back flow of heated air into the pneumatic system, one-way check valves may be interposed into the flow path to prevent the occurrence of such back flow.

Such one-way check valves are known to the art and are designed to cooperate with the design of the dessicant tower and reside in a cavity provided therein. The check valves known to the prior art however, have demonstrated several serious disadvantages which have limited their useful life within the environment of such high-pressure, high-temperature systems.

OBJECTS OF THE INVENTION

It is an object of the present invention to provide a cartridge-within-a cavity, one-way valve with a longer service life in a high-pressure, high-temperature system.

The other objects, features and advantages of the present invention will become more apparent in light of the following detailed description of the preferred embodiment thereof.

According to the present invention, there is provided an improved cartridge-within-a-cavity, one-way valve for use in a high-pressure, high-temperature fluid environment wherein said cavity comprises an outer attachment portion and an inner valve portion having a central inlet at its innermost point, and a radial outlet around its outer periphery, said valve comprising:
a body of generally cylindrical shape and having a substantially solid attachment portion at one end thereof and a hollow valve portion at the other end thereof, said attachment portion being provided with attachment means to hold said valve within said cavity, said valve portion having a hollow central annular cavity extending through the end of said body farthest removed from the attachment portion, and said valve portion being further provided with a plurality of radial openings connecting the central annular cavity of said valve portion with the exterior of said valve portion;

a plunger of generally cylindrical shape fitting within the annular cavity within said body and having an exterior dimension approximately equal to the interior dimension of the annular cavity within said body and having a length such that, when fully inserted within the annular cavity said plunger does not block the radial openings in the valve portion;

compression means to reside within the annular cavity of said body in mating engagement with said plunger, which compression means acts with a specific force to oppose the full insertion of said plunger within the annular cavity;

an annular disk-shaped seat fixedly attached to said body at the end of said body farthest removed from the attachment means, said seat having a central opening therethrough of smaller diameter than the central annular cavity and said compression means acts to hold said plunger against said seat; and wherein pressurized fluid flow from the central inlet of said cavity will force said plunger away from said seat and back into the central annular cavity of said body against said compression means, allowing fluid flow through the radial openings in the valve portion of said body to the radial outlet of said cavity, while pressurized fluid flow from the radial outlet of said cavity will be unable to displace said plunger permitting backflow.

DETAILED DESCRIPTION OF THE PREFERRED EMBODIMENT

As noted previously, large pneumatic systems often employ dessicant units which are typically redundant, allowing a dessicant unit to be removed from the pneumatic fluid flow and regenerated. Such regeneration is typically carried out by purging the unit with hot air or another fluid which will absorb captured water vapor from the dessicant.

In order to insure one-way flow of pneumatic fluid and prevent back flow of regenerative fluid into the pneumatic system, one-way check valves may be interposed into the flow path to prevent the occurance of such back flow.

Such one-way check valves are designed to cooperate with the design of the dessicant unit and reside in a cavity provided therein. A cavity, functionally typical of the cavities thus provided, is shown in essential detail in FIG. 1.

Figure 1:
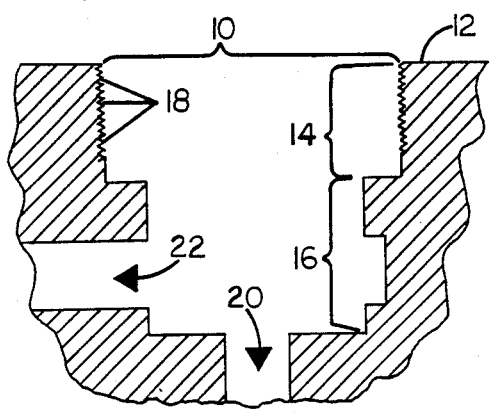
FIG. 1 Illustrates in essential detail and in cross-section a typical cavity into which a cartridge check valve of the present invention would be put into service.

In FIG. 1, there is shown a functional depiction of the check-valve cavity (10) in a dessicant unit (12). Of course, the dessicant unit (12) and even the cavity (10) itself involve numerous details which are not shown in FIG. 1, and which are unnecessary to understanding the operation of the check valve of the present invention.

With continued reference to FIG. 1, it should be noted that cavity (10) further comprises an attachment portion (14) and a valve portion (16). The attachment portion (14) is provided with some kind of attachment means such as the screw threads (18) illustrated, which are intended to communicate with mating screw threads on the check valve cartridge, if that form of attachment is employed.

With further reference to FIG. 1, valve portion (16) of cavity (10) illustrates functionally central inlet (20) and radial outlet (22). Central inlet (20), may involve substantial structural features which are not shown, and which are unnecessary to illustrate the operation of the check valve of the present invention. In the proper operation of the dessicant unit (12) a pressurized flow of fluid is intended to be introduced into cavity (10) from central inlet (20).

Likewise, radial outlet (22) may involve substantial structural features which are not shown, and which are unnecessary to the operation of the check valve of the present invention. In the proper operation of the dessicant unit (12) a pressurized flow of fluid is intended to be conveyed away from the cavity (10) by radial outlet (22).

Figure 2:
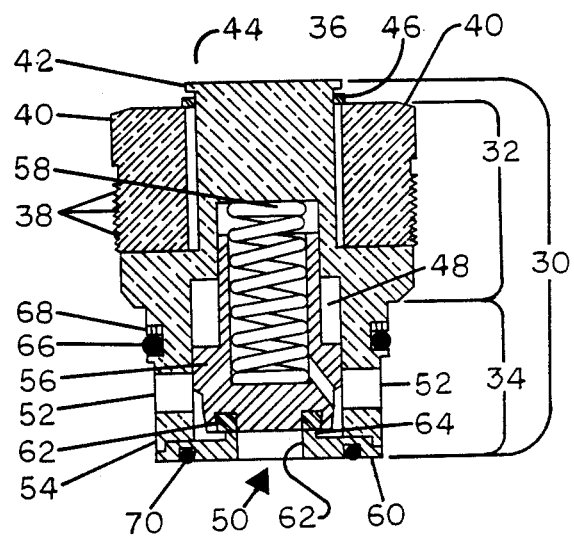
FIG. 2 Shows, in cross-section, a cartridge check valve of the present invention.

The improved cartridge check-valve of the present invention is shown in cross-section in FIG. 2. As seen therein, the check-valve (30) is intended for use as a cartridge in a cavity such as check-valve cavity (10) in dessicant unit (12) shown in FIG. 1. check-valve (30) shown in FIG. 2 comprises attachment portion (32) and valve portion (34). Attachment portion (32) of check-valve (30) shown in FIG. 2 is intended to engage attachment portion (14) of cavity (10) shown in FIG. 1. In similar manner, valve portion (34) of check-valve (30) shown in FIG. 2 is intended to cooperate with valve portion (16) of cavity (10) shown in FIG. 1.

With reference to FIG. 2, check-valve (30) in the embodiment illustrated, comprises body (36) which is generally cylindrical in shape and typically at least equal in length to the depth of the cavity in which it is intended to reside. In practice, of course, the check-valve (30) will have external dimensions appropriate for the cavity in which it is used, and the body (36) will often share those dimensions. The body (36) of check-valve (30) extends throughout attachment portion (32) and valve portion (34) of check-valve (30) and may have a length which is greater than the depth of the cavity to provide some external extension which would assist in insertion and removal of the check-valve (30) if that is desired.

The attachment portion (32) of body (36) is provided with some form of attachment means (38) which may be screw threads or some other attachment means known to the art. Such attachment means may be integral with the body (36) and, for example, the attachment portion (32) of the check-valve (30) may form an integral threaded bolt. Alternatively, the attachment means (38) may be a hollow threaded bolt (40) as illustrated in FIG. 2. Where such a hollow threaded bolt (40) is employed, it should be held in place by some means, such as the annular projection (42) at the outer terminal end (44) of the attachment portion (32) of body (36), in combination with locking ring (46).

Valve portion (34) of the body (36) further comprises a hollow central annular cavity (48) extending through the opposite or inner terminal end (50). In addition, the valve portion (34) of the body (36) is further provided with a plurality of radial opening (52) along its length connecting the central annular cavity (48) with the exterior (54) of said valve portion (34).

Within the central annular cavity (48) of body (36) resides a plunger (56) which is also of generally cylindrical shape to fit within the annular cavity (48), which central annular cavity (48) may extend into the attachment portion (32) of the body (36). The exterior dimensions of the plunger (56) should be approximately equal to the interior dimensions of the annular cavity (48) to accommodate cooperative operation. Further, the plunger (56) should have a length which permits it to be fully inserted into the annular cavity (48) to a point which does not block the radial openings (52) in the valve portion (34) of the body (36).

Also contained within the annular cavity (48) in mating engagement with the plunger (56) is some form of compression means, shown as spring (58) in the illustrated embodiment. The compression means, spring (58), acts with a specific force to oppose the full insertion of the plunger (56) into the annular cavity.

With continued reference to FIG. 2, there is also shown an annular disk-shaped seat (60) fixedly attached to the body (36) at the inner terminal end (50). This annular seat (60) has a central opening therethrough of smaller diameter than the central annular cavity (48) such that the plunger (56) is contained within the annular cavity (48). Compression means, spring (58) acts to hold said plunger (56) against the seat (60).

In consideration of the extreme environment in which the check valve (30) of the present invention is employed, it may be advisable to provide an annular disk of wear resistant material at the point of contact where the plunger (56) and the annular seat (60) come into contact. In the illustrated embodiment, such an annular disk (62) of wear resistant material is shown as an insert in the contact face of the plunger (56), although the need for and the position and location of such wear resistant material may vary with the particular environment of use and valve design. Materials such as polyimide, such as the material commercially available under the trade designation Vespel SP-21, from E.I. duPont de Nemours, and polybenzimidazole, such as the material commercially available under the trade designation Celazole, from Hoechst-Celanese have proven useful for this purpose, although the former material is slightly preferred.

It is also preferred in the construction of the check-valve (30) in the embodiment illustrated in FIG. 2, if disk-shaped seat (60) is provided with an annular ring (64) extending into the central annular cavity (48) of the body (36) of the valve (30).

The performance of the check-valve (30) of the present invention will be greatly improved if certain portions of the fluid flow path are adequately sealed. Certainly, it is beneficial to seal the valve portion (34) of the check-valve (30) from the environment, and this is done, at least in part by the engagement of attachment means (38) with the attachment portion (14) of the check-valve cavity (10) shown in FIG. 1. For preferred operation, however, it is best if the attachment means (38) is protected from the fluid flow path and some form of sealing means may be employed for this purpose. In the embodiment illustrated in FIG. 2, first elastomeric O-ring (66) and back-up ring (68) are illustrated for this purpose. Such sealing may be provided by an elastomeric O-ring, a crushable metallic ring, or by some other method known to the art.

Likewise, it is useful to insure that the valve is not short-circuited, by fluid flow from radial outlet (22) to central inlet (20) of the check-valve cavity (10) shown in FIG. 1, around the check-valve (30) of the present invention. One way in which this may effectively be done is by providing a second sealing means between the central inlet (20) and the radial outlet (22).

In FIG. 2 such second sealing means may be provided by a second elastomic O-ring (70) which contacts the base of the check-valve cavity, isolating the central inlet of the cavity. Again, such sealing may be provided by an elastomeric O-ring, a crushable metallic ring, or by some other method known to the art.

Figure 3:
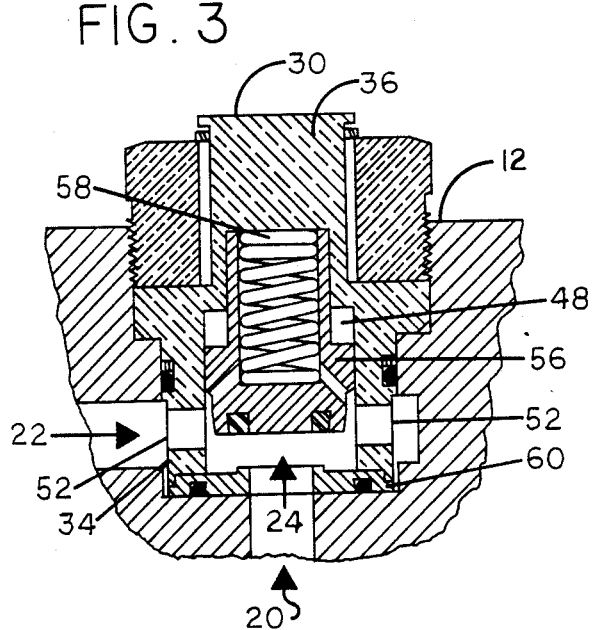
FIG. 3 Illustrates pressurized fluid flow through a cartridge check valve of the present invention within a typical cavity, both shown in cross-section.

FIG. 3 illustrates pressurized fluid flow through a cartridge check valve of the present invention within a typical cavity, both shown in cross-section. The check-valve (30) substantially fills the cavity in dessicant unit (12) when properly positioned. Pressurized fluid flow from central inlet (20) illustrated by arrow (24) will force plunger (56) away from seat (60) and back into the central annular cavity (48) of the body (36) against the compression means, spring (58). This allows the fluid to flow through the radial opening (52) in the valve portion (34) of the body (36) to the radial outlet (22) of the cavity.

Figure 4:
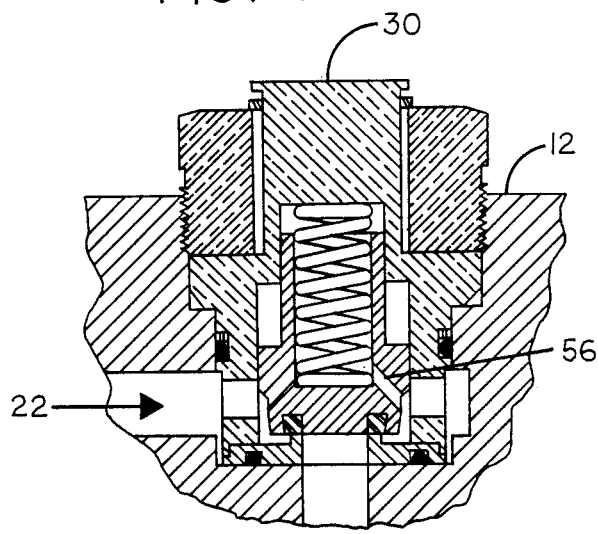
FIG. 4 Illustrates a back-flow condition in which a cartridge check valve of the present invention within a typical cavity, both shown in cross-section, prevents flow.

FIG. 4. illustrates a back-flow condition in which a cartridge check-valve of the present invention within a typical cavity, both shown in cross-section, prevents flow. Again the check-valve (30) substantially fills the cavity in dessicant unit (12) when properly positioned. Pressurized fluid back-flow from radial outlet (22), however, is unable to displace plunger (56) permitting back-flow.

In the preferred embodiment of the present invention, the body and plunger components should be prepared from nickel-copper alloy in accordance with Federal specification No. QQ-N-281. Alternatively, stainless steel in accordance with QQ-S-763 or titanium in accordance with Military specification No. MIL-T-9046 may be employed. The hollow threaded bolt (attachment means) and the disk-shaped seat may be prepared from the same materials or from a copper-nickel alloy prepared in accordance with Military Specification No. MIL-C-15726. The bolt may also be fabricated from bronze in accordance with Federal specification No. QQ-C-390.

The spring employed in the preferred embodiment of the present invention is preferably stainless steel in accordance with ASTM Standard A313, although chrome vanadium alloy in accordance with ASTM Standard A232 may be substituted.

The locking ring employed in the preferred embodiment of the present invention is preferably stainless steel in accordance with ASTM Standard A564, although either carbon spring steel in accordance with SAE 1060-1090 or beryllium copper alloy in accordance with Alloy 25 CDA 172 may be substituted.

As noted previously, the preferred embodiment of the present invention may employ wear resistant material on the face of the plunger component. Preferably a polyimide material, such as that available commercially from E.I. duPont de Nemours, Inc. under the trade designation "Vespel SP-21" is employed for this purpose although a polybenzimidazole material such as that available from Hoechst-Celanese under the trade designation "Celazole" may be substituted.

Elastomeric O-rings employed for sealing the valve of the present invention within a cavity should preferably be prepared from fluorocarbon material meeting Military specification No. MIL-R-83248 available commercially from Dupont under the trademark "Viton". Alternatively, the elastomeric material may be Kalrez Type 3018, commercially available from Dupont, or Chemrez Type 510, commercially available from Greene, Tweed & Co.

The back-up ring (68) in the illustrated embodiment should preferably be prepared from tetrafluoroethylene material meeting Military specification No. MIL-R-8791 available commercially from Dupont under the trademark "Teflon." Alternatively, a mixture of Celazole and Teflon commercially available from Hoechst-Celanese may be substituted.

It will be evident that the terms and expressions that have been employed herein are used as terms of description and not of limitation. There is no intention in the use of such terms and expressions of excluding equivalents of the feature shown and described or portions thereof, and it is recognized that various modifications are possible within the scope of the invention claimed.

What is claimed is:

1. An improved cartridge-within-a-cavity one-way valve for use in a high-pressure, high-temperature fluid environment wherein said cavity comprises an outer attachment portion and an inner valve portion having a central inlet at its innermost point, and a radial outlet around its outer periphery, said valve comprising:
a body of generally cylindrical shape and having a length approximately equal to the depth of the cavity in which the valve is intended to reside, and having a substantially solid attachment portion at one end thereof and a hollow valve portion at the other end thereof, said attachment portion being provided with attachment means to hold said valve within said cavity, and said valve portion having a hollow central annular cavity extending through the end of said body farthest removed from the attachment portion, said valve portion being further provided with a plurality of radial openings connecting the central annular cavity of said valve portion with the outer surface of said valve portion;

a plunger of generally cylindrical shape fitting within the annular cavity within said body and having an exterior dimension approximately equal to the interior dimension of the annular cavity within said body and having a length such that, when fully inserted within the annular cavity said plunger does not block the radial openings in the valve portion;

compression means to reside within the annular cavity of said body in mating engagement with said plunger, which compression means acts with a specific force to oppose the full insertion of said plunger within the annular cavity;

an annular disk-shaped seat fixedly attached to said body at the end of said body farthest removed from the attachment means, said seat having a central opening there through the smaller diameter than the central annular cavity such that said plunger is contained within the annular cavity and said compression means acts to hold said plunger against said seat; and wherein pressurized fluid flow from the central inlet of said cavity will force said plunger away from said seat and back into the central annular cavity of said body against said compression means, allowing fluid flow through the radial openings in the valve portion of said body to the radial outlet of said cavity, while pressurized fluid flow from the radial outlet of said cavity will be unable to displace said plunger permitting backflow; and wherein the attachment means comprises a threaded bolt which is a hollow cylinder which surrounds the attachment portion of said valve; and wherein said body of the valve is further provided with an annular projection at the terminal end of the attachment portion and the threaded bolt is held in place by a locking ring engaging the annular projection.

2. The valve of claim 1 wherein the central annular cavity extent into the attachment portion.

3. The valve of claim 1 wherein said plunger is provided with an annular disk of wear-resistant material at the point of contact of said plunger with said seat.

4. The valve of claim 3 wherein said wear-resistant material is a polyimide.

5. The valve of claim 3 wherein said wear-resistant material is a polybenzimidaxole.

6. The valve of claim 1 wherein said compression means is a spring.

7. The valve of claim 1 wherein said seat is further provided with an annular ring extending inward to the central annular cavity of said body of the valve.

8. The valve of claim 1 further comprising a first sealing means separating the valve portion of said cavity from the attachment portion of said cavity when said valve is positioned within said cavity.

9. The valve of claim 8 wherein said first sealing means comprises an elastomeric O-ring.

10. The valve of claim 8 wherein said first sealing means comprises a crushable metal component.

11. The valve of claim 1 further comprising a second sealing means separating the central inlet of said cavity from the radial outlet of said cavity when the valve is positioned within said cavity.

12. The valve of claim 11 wherein said second sealing means comprises an elastomeric O-ring.

13. The valve of claim 11 wherein said second sealing means comprises a crushable metal component.

* * * * *